Patented May 10, 1949

2,469,355

UNITED STATES PATENT OFFICE 2,469,355

PRODUCTION OF ALKYLHALOSILANES

Lee De Pree, Holland, and Arthur J. Barry and Donald E. Hook, Midland, Mich., assignors to The Dow Chemical Company, Midland, Mich., a corporation of Delaware No Drawing. Application November 13, 1946, Serial No. 709,422

9 Claims. (Cl. 260—448.2)

This invention relates to the preparation of alkylhalosilanes. It is particularly concerned with a new reaction between an alkyl halide and a compound of silicon containing both hydrogen and halogen attached directly to the silicon atom.

Briefly, we have found that an alkyl halide in which the alkyl radical contains a plurality of carbon atoms may be caused to react with an inorganic compound of silicon which contains at least one hydrogen atom and at least one halogen atom attached directly to the silicon atom, e. g. $HSiCl_3$, at a temperature of 400° C. or below, by conducting the reaction at an elevated pressure, for instance a pressure above 100 pounds, and usually in the order of from 200 to 2500 pounds per square inch, or higher. The products of reaction comprise the corresponding alkylhalosilane and an inorganic halosilane more highly halogenated than the starting material. Minor amounts of a saturated hydrocarbon, hydrogen, a hydrogen halide, etc. are formed as by-products. For example, when a mixture of ethyl chloride and trichlorosilane is heated in a closed system, there is produced for the most part ethyltrichlorosilane and silicon tetrachloride, together with smaller quantities of ethane and hydrogen.

Apparently, the rate and efficiency of the reaction are dependent to a large extent upon the proximity of the molecules to be reacted. Employment of a pressure sufficient to liquefy a portion of the reaction mixture results in rapid reaction at a lower temperature than when the mixture is entirely in the vapor phase. The pressure which may most advantageously be employed depends, of course, upon the starting materials, but in general lies within the range stated above. The pressure may be developed autogenously within a system or may be superimposed by means of a pump or by development of a hydrostatic pressure.

The reaction may be carried out satisfactorily at temperatures below 400° C., e. g. between 250° and 400° C., the optimum temperature depending to some extent upon the pressure. Heating the system at higher temperatures, e. g. above 400° C., usually results in the production of complex mixtures, probably due to decomposition of primary products, occurrence of side reactions, etc.

As has been stated previously, halosilanes which may be satisfactorily employed under the conditions of this invention are inorganic compounds of silicon containing at least one hydrogen atom and at least one halogen atom attached directly to the single silicon atom of the molecule. We prefer to use trichlorosilane, $HSiCl_3$, although tribromosilane, $HSiBr_3$, dichloromonofluorosilane, $HSiFCl_2$, monobromodichlorosilane, $HSiBrCl_2$, etc., may be employed if desired.

Suitable alkyl halides include monochloro- and monobromo-substituted alkanes containing a plurality of carbon atoms in the molecule, such as ethyl chloride, propyl bromide, n-butyl chloride, n-butyl bromide, isobutyl chloride, decyl chloride, decyl bromide, dodecyl chloride, octadecyl chloride, etc.

Commercial grades of the starting materials may be employed, but impurities present in reactants of technical quality sometimes take part in side reactions which consume a portion of the halosilane, with resultant reduction in the yield of the desired product. Because of the fact that the reaction products are hydrolyzable, it is important that the reaction be carried out under substantially anhydrous conditions.

The preferred mode of practicing the invention involves heating a mixture of the alkyl halide and an inorganic trihalosilane in a suitable reaction vessel, e. g. a bomb or autoclave. Usually from 0.5 to 3.0 molar equivalents of trihalosilane are employed for each molar equivalent of alkyl halide. It is sometimes advantageous to employ a solvent, e. g. a saturated fraction of petroleum, which is substantially inert under the reaction conditions, to insure mutual solution of the starting materials. The reaction products and any unreacted materials are withdrawn from the reactor and purified, e. g. by fractional distillation. Unreacted components may be returned to stock for further processing. The reaction may be carried out batchwise or in continuous manner, e. g. by passing a stream of the reaction mixture under pressure through a heated tubular autoclave.

The following examples illustrate certain ways in which the principle of the invention has been applied, but are not to be construed as limiting the invention:

Example 1

One gram molecular equivalent weight of ethyl chloride and one gram mol of trichlorosilane were charged into a nickel bomb of 500 milliliter capacity. The sealed bomb was heated to a temperature of 312°–316° C., as measured by a thermocouple in a thermocouple well of the bomb. During heating, the maximum pressure attained within the system was approximately 1800 pounds per square inch. Heating was continued for 22 hours, after which the bomb was cooled and vented through condensers. The condensate was subsequently fractionally distilled. There were obtained 0.21 gram mol of ethyltrichlorosilane and 0.66 gram mol of silicon tetrachloride.

In another experiment, the bomb was charged with 0.5 gram mol of ethyl chloride and one gram mol of trichlorosilane, and heated at 263°–282° C. for 16 hours. There were obtained 0.11 gram mol of ethyltrichlorosilane and 0.52 gram mol of silicon tetrachloride.

In both experiments unreacted trichlorosilane was also recovered.

Example 2

By procedure similar to that described in Example 1, a mixture of 0.5 gram molecular weight of n-propyl chloride and 0.5 gram mol of trichlorosilane was reacted at 263°–284° C., and the reaction products condensed and purified. There were obtained approximately 0.12 gram mol of propyltrichlorosilane and 0.23 gram mol of silicon tetrachloride. Unreacted trichlorosilane was also recovered.

Example 3

A bomb charged with 0.5 gram molecular weight of n-butyl chloride and 0.5 gram mol of trichlorosilane was heated at 263°–284° C. for 16 hours, and the reaction products collected as in the preceding examples. There was obtained approximately 0.12 gram mol of a product distilling at 144.5°–150° C. at 740 millimeters absolute pressure, and consisting of a mixture of normal- and secondary-butyltrichlorosilanes. About 0.32 gram mol of silicon tetrachloride was also obtained.

The experiment was repeated, employing isobutyl chloride as a reactant. Approximately 0.17 gram mol of butyltrichlorosilane, distilling principally at 140.5°–145° C., and consisting chiefly of isobutyltrichlorosilane was obtained, together with 0.21 gram mol of silicon tetrachloride. Unreacted trichlorosilane was also recovered.

Example 4

By procedure similar to that described in the preceding examples, a mixture of higher alkyl chlorides (prepared from Lorol, i. e. technical lauryl alcohol) was reacted with trichlorosilane in a bomb. The product comprised a mixture of higher alkyltrichlorosilanes, distilling at temperatures between 104° and 195° C. at 12–13 millimeters absolute pressure, and also silicon tetrachloride and unreacted trichlorosilane.

Operating in a manner similar to that described in the examples given above, ethyl bromide and tribromosilane may be reacted to produce ethyltribromosilane; propyl bromide and tribromosilane may be reacted to produce propyl tribromosilane; butyl bromide may be reacted with tribromosilane to give butyltribromosilane, decyl bromide and tribromosilane may be reacted to give decyl tribromosilane; octadecyl bromide may be reacted with tribromosilane to produce octadecyl tribromosilane; etc.

This application is a continuation-in-part of our copending application, Serial No. 674,925, filed June 6, 1946.

Other modes of applying the principle of the invention may be employed instead of those explained, change being made as regards the compounds and materials herein disclosed, provided the steps or compounds stated by any of the following claims or equivalents of such steps or compounds be employed.

We therefore point out and distinctly claim:

1. The process which comprises reacting an alkyl halide, in which the alkyl radical contains a plurality of carbon atoms, with an inorganic halosilane consisting of hydrogen, halogen, and silicon atoms and having both hydrogen and halogen atoms attached directly to the silicon atom, at a pressure of at least 100 pounds per square inch and a temperature between 250° and 400° C. to form an alkylhalosilane.

2. A process for the preparation of an alkylhalosilane which comprises reacting an alkyl halide, in which the alkyl radical contains a plurality of carbon atoms, with an inorganic halosilane consisting of hydrogen, halogen, and silicon atoms and having both hydrogen and halogen atoms attached directly to the silicon atom at a temperature between 250° and 400° C. and a pressure of at least 100 pounds per square inch.

3. A process for the preparation of an alkyltrihalosilane which comprises reacting an alkyl halide, containing a plurality of carbon atoms in the alkyl radical, with a trihalosilane, having the halogen atoms and a hydrogen atom attached to a silicon atom, at a temperature between 250° and 400° C. and a pressure of at least 100 pounds per square inch.

4. A process for the preparation of an alkyltrichlorosilane which comprises reacting an alkyl halide, containing a plurality of carbon atoms in the alkyl radical, with trichlorosilane at a temperature between 250° and 400° C. and a pressure of at least 100 pounds per square inch.

5. A process for the preparation of an alkyltrichlorosilane which comprises reacting an alkyl chloride, containing a plurality of carbon atoms in the alkyl radical, with trichlorosilane at a temperature between 250° and 400° C. and a pressure of at least 100 pounds per square inch.

6. A process for the preparation of an alkyltrichlorosilane which comprises reacting an alkyl chloride, containing from 2 to 18 carbon atoms in the alkyl radical, with trichlorosilane at a temperature between 250° and 400° C. and a pressure of at least 100 pounds per square inch.

7. The process for the preparation of ethyltrichlorosilane which comprises reacting ethyl chloride with trichlorosilane at a temperature between 250° and 400° C. and a pressure of at least 100 pounds per square inch.

8. The process for the preparation of propyltrichlorosilane which comprises reacting propyl chloride with trichlorosilane at a temperature between 250° and 400° C. and a pressure of at least 100 pounds per square inch.

9. The process for the preparation of lauryl trichlorosilane which comprises reacting lauryl chloride with trichlorosilane at a temperature between 250° and 400° C. and a pressure of at least 100 pounds per square inch.

LEE DE PREE.
ARTHUR J. BARRY.
DONALD E. HOOK.

REFERENCES CITED

The following references are of record in the file of this patent:

UNITED STATES PATENTS

| Number | Name | Date |
| --- | --- | --- |
| 2,379,821 | Miller | July 3, 1945 |
| 2,407,181 | Scott | Sept. 3, 1946 |